(12) United States Patent
Hermes et al.

(10) Patent No.: US 7,963,333 B2
(45) Date of Patent: Jun. 21, 2011

(54) CONTROLLING THE PRESSURE WITHIN AN ANNULAR VOLUME OF A WELLBORE

(75) Inventors: Robert E. Hermes, Los Alamos, NM (US); Manuel E. Gonzalez, Kingwood, NM (US); Brian C. Llewellyn, Kingwood, TX (US); James B. Bloys, Katy, TX (US); Don M. Coates, Santa Fe, NM (US)

(73) Assignees: Chevron U.S.A. Inc., San Ramon, CA (US); Los Alamos National Security LLC, Los Alamos, NM (US)

( * ) Notice: Subject to any disclaimer, the term of this patent is extended or adjusted under 35 U.S.C. 154(b) by 0 days.

(21) Appl. No.: 12/641,257

(22) Filed: Dec. 17, 2009

(65) Prior Publication Data

US 2010/0163236 A1 Jul. 1, 2010

Related U.S. Application Data

(62) Division of application No. 12/249,852, filed on Oct. 10, 2008, now Pat. No. 7,743,830, which is a division of application No. 11/282,424, filed on Nov. 18, 2005, now Pat. No. 7,441,599.

(51) Int. Cl.
*E21B 33/13* (2006.01)
*E21B 36/00* (2006.01)
*E21B 43/00* (2006.01)

(52) U.S. Cl. ........ 166/300; 166/302; 166/371; 507/260; 507/271; 507/902

(58) Field of Classification Search ........................ None
See application file for complete search history.

(56) References Cited

U.S. PATENT DOCUMENTS

| | | | |
|---|---|---|---|
| 3,223,761 A | 12/1965 | Raley | |
| 3,352,790 A | 11/1967 | Sugarman et al. | |
| 3,417,816 A | 12/1968 | Morris et al. | |
| 3,527,168 A | 9/1970 | Friedlander et al. | |
| 3,886,075 A | 5/1975 | Bernardino | |
| 3,935,910 A | 2/1976 | Gaudy et al. | |
| 4,184,790 A | 1/1980 | Bassett | |
| 4,417,625 A | 11/1983 | Henson et al. | |
| 4,846,278 A | 7/1989 | Robbins | |
| 4,883,125 A | 11/1989 | Wilson et al. | |
| 5,514,360 A | 5/1996 | Sleight et al. | |

(Continued)

FOREIGN PATENT DOCUMENTS

WO   WO 98/57028   12/1998

(Continued)

OTHER PUBLICATIONS

Creel, Prentice and Ron Crook, "Gels, monomer solutions fix pinhole casing leaks", *Oil & Gas Journal* 95(41):44-46 (1997).

(Continued)

*Primary Examiner* — George Suchfield
(74) *Attorney, Agent, or Firm* — Merchant & Gould

(57) ABSTRACT

A process is described for replacing at least a portion of the liquid within the annular volume of a casing system within a wellbore with a second liquid. The second liquid is preselected to provide a measure of control of the pressure within the annular volume as the fluid within the volume is being heated.

17 Claims, 4 Drawing Sheets

U.S. PATENT DOCUMENTS

| | | | |
|---|---|---|---|
| 5,866,516 | A | 2/1999 | Costin |
| 5,919,720 | A | 7/1999 | Sleight et al. |
| 6,009,945 | A | 1/2000 | Ricks |
| 6,164,378 | A | 12/2000 | Coronado |
| 6,183,716 | B1 | 2/2001 | Sleight et al. |
| 6,187,839 | B1 | 2/2001 | Eoff et al. |
| 6,675,898 | B2 | 1/2004 | Staudt |
| 6,745,844 | B2 | 6/2004 | Henderson |
| 6,780,507 | B2 | 8/2004 | Toreki et al. |
| 6,817,418 | B2 | 11/2004 | Gatherar et al. |
| 6,938,707 | B2 | 9/2005 | Schmidt et al. |
| 7,048,059 | B2 | 5/2006 | Adams et al. |
| 7,066,284 | B2 | 6/2006 | Wylie et al. |
| 7,096,944 | B2 | 8/2006 | Vargo et al. |
| 7,441,599 | B2 | 10/2008 | Hermes et al. |
| 7,510,005 | B2 * | 3/2009 | Coates et al. ............ 166/288 |
| 7,743,830 | B2 * | 6/2010 | Hermes et al. ............ 166/288 |
| 2002/0139536 | A1 | 10/2002 | Staudt |
| 2004/0069495 | A1 | 4/2004 | Adams et al. |
| 2004/0238178 | A1 | 12/2004 | Laureano et al. |
| 2005/0194144 | A1 | 9/2005 | Vargo et al. |
| 2006/0084580 | A1 | 4/2006 | Santra et al. |

FOREIGN PATENT DOCUMENTS

| | | |
|---|---|---|
| WO | WO 2004/035986 | 4/2004 |
| WO | WO 2004/038164 | 5/2004 |
| WO | WO 2005/085586 | 9/2005 |

OTHER PUBLICATIONS

Eoff, Larry and James Griffith, "Acrylate monomer solution stops artesian water, geopressured sand flows", *Oil & Gas Journal* 96(44):89-91 (1998).

Moe, B. et al. "Annular pressure buildup: what it is and what to do about it", *Deepwater Technology*, 21-23 (2002).

Oudeman, P., et al., "Transient behaviour of annular pressure buildup in HP/HT Wells", SPE 88735.

Vargo, Jr. F. et al., "Practical and Successful Prevention of Annular Pressure Buildup on the Marlin Project", *Proceedings- SPE Annual Technical Conference and Exhibition*, pp. 1235-1244 (2002).

Azzola, J.H. et al., "Application of Vacuum Insulated Tubing to Mitigate Annular Pressure Buildup", *Proceedings-SPE Annula Technical Conference and Exhibition*, pp. 1988-1905 (2004).

Leach, C.P., et al., "A New Method for the Relief of Annular Heat-up Pressure", *Proceedings—spe Annual Technical Conference and Exhibition* pp. 819-826 (1993).

Williamson, R., et al., "Control of Contained-Annulus Fluid Pressure Buildup", *Proceedings-SPE/IADC Drilling Conference* paper #79875 (2003).

"Acrylic and Methacrylic Ester Polymers", *Encyclopedia of Polymer Science and Engineering*, $2^{nd}$ Edition, J. Kroschwitz, ed., John Wiley & Sons, Inc., vol. 1, Table 20, p. 266 (1985).

Tildbrook, D.A., et al., "Prediction of Polymerization Shrinkage Using Molecular Modeling", *J. Poly. Sci; Part B: Polymer Physics*, 41:528-548 (2003).

Loder, T., et al., Prediction of and Effective Preventative Solution for Annular Fluid Pressure Buildup on Subsea Completed Wells—Case Study, SPE 84270.

Watson, P., et al., : An Innovative Approach to Development Drilling in Deepwater Gulf of Mexico: SPE/IADC 79809.

Carpenter, R.B. et al., "Remediating Sustained Casing Pressure by Forming a Downhole Annular Seal with Low-Melt-Point Eutectic Metal", IADC/.

Samuel, Robella G., et all, "Multistring Casing Design for Deepwater and Ultradeep HP/HT Wells: A New Approach", IADC/SPE 74490.

* cited by examiner

CONTROLLING THE PRESSURE WITHIN AN ANNULAR VOLUME OF A WELLBORE

This application is a divisional of U.S. application Ser. No. 12/249,852, filed on Oct. 10, 2008 now U.S. Pat. No. 7,743,830, which is a divisional of U.S. application Ser. No. 11/282,424, filed on Nov. 18, 2005, now U.S. Pat. No. 7,441,599, issued Oct. 28, 2008, the contents of which are hereby incorporated by reference in their entirety.

This application was made with government support under Contract No. W-7405-ENG-36 awarded by the U.S. Department of Energy. The government has certain rights in the invention.

BACKGROUND OF THE INVENTION

The present invention relates to a method for controlling the pressure generated by a fluid contained within a confined volume while the fluid within the volume is being heated. In a preferred embodiment, the present invention relates to a process for controlling the pressure within the annular volume described by a casing string assembly within a wellbore.

During the process of drilling a wellbore, such as an oil well, individual lengths of relatively large diameter metal tubulars are typically secured together to form a casing string or liner that is positioned within each section of the wellbore. Each of the casing strings may be hung from a wellhead installation near the surface. Alternatively, some of the casing strings may be in the form of liner strings that extend from near the setting depth of a previous section of casing. In this case, the liner string will be suspended from the previous section of casing on a liner hanger. The casing strings are usually comprised of a number of joints or segments, each being on the order of forty feet long, connected to one another by threaded connections or other connection means. These connections are typically metal pipes, but may also be non-metal materials such as composite tubing. This casing string is used to increase the integrity of the wellbore by preventing the wall of the hole from caving in. In addition, the casing string prevents movement of fluids from one formation to another formation through which the wellbore passes.

Conventionally, each section of the casing string is cemented within the wellbore before the next section of the wellbore is drilled. Accordingly, each subsequent section of the wellbore must have a diameter that is less than the previous section. For example, a first section of the wellbore may receive a surface (or conductor) casing string having a 20-inch diameter. The next several sections of the wellbore may receive intermediate (or protection) casing strings having 16-inch, 13⅜-inch and 9⅝-inch diameters, respectively. The final sections of the wellbore may receive production casing strings having 7-inch and 4½-inch diameters, respectively. When the cementing operation is completed and the cement sets, there is a column of cement in the annulus described by the outside surface of each casing string.

Subterranean zones penetrated by well bores are commonly sealed by hydraulic cement compositions. In this application, pipe strings such as casings and liners are cemented in well bores using hydraulic cement compositions. In performing these primary cementing operations, a hydraulic cement composition is pumped into the annular space described by the walls of a well bore and the exterior surfaces of a pipe string disposed therein. The cement composition is permitted to set in the annular space to form an annular sheath of hardened substantially impermeable cement which supports and positions the pipe string in the well bore and seals the exterior surfaces of the pipe string to the walls of the well bore. Hydraulic cement compositions are also utilized in a variety of other cementing operations, such as sealing highly permeable zones or fractures in subterranean zones, plugging cracks or holes in pipe strings and the like.

Casing assemblies comprising more than one casing string describe one or more annular volumes between adjacent concentric casing strings within the wellbore. Normally, each annular volume is filled, at least to some extent, with the fluid which is present in the wellbore when the casing string is installed. In a deep well, the quantities of fluid within the annular volume (i.e. the annular fluid) may be significant. Each annulus 1 inch thick by 5000 feet long would contain roughly 50,000 gallons, depending on the diameter of the casing string.

In oil and gas wells it is not uncommon that a section of formation must be isolated from the rest of the well. This is typically achieved by bringing the top of the cement column from the subsequent string up inside the annulus above the previous casing shoe. While this isolates the formation, bringing the cement up inside the casing shoe effectively blocks the safety valve provided by nature's fracture gradient. Instead of leaking off at the shoe, any pressure buildup will be exerted on the casing, unless it can be bled off at the surface. Most land wells and some offshore platform wells are equipped with wellheads that provide access to every casing annulus and an observed pressure increase can be quickly bled off On the other hand, most subsea wellhead installations do not provide access to the casing annuli and a sealed annulus may be created. Because the annulus is sealed, the internal pressure can increase significantly in reaction to an increase in temperature.

The fluids in the annular volume during installation of the casing strings will generally be at or near the ambient temperature of the seafloor. When the annular fluid is heated, it expands and a substantial pressure increase may result. This condition is commonly present in all producing wells, but is most evident in deep water wells. Deep water wells are likely to be vulnerable to annular pressure buildup because of the cold temperature of the displaced fluid, in contrast to elevated temperature of the production fluid during production. The temperature of the fluid in the annular volume when it is sealed will generally be the ambient temperature, which may be in the range of from 0° F. to 100° F. (for example 34° F.), with the lower temperatures occurring most frequently in subsea wells with a considerable depth of water above the well. During production from the reservoir, produced fluids pass through the production tubing at significantly higher temperatures. Temperatures in the range of 50° F. to 300° F. are expected, and temperatures in the range of 125° F. to 250° F. are frequently encountered.

The relatively high temperature of the produced fluids increases the temperature of the annular fluid between the casing strings, and increases the pressure against each of the casing strings. Conventional liquids which are used in the annular volume expand with temperature at constant pressure; in the constant volume of the annular space, the increased fluid temperature results in significant pressure increases. Aqueous fluids, which are substantially incompressible, could increase in volume by upwards of 5% during the temperature change from ambient conditions to production conditions at constant pressure. At constant volume, this increase in temperature may result in pressure increases up to on the order of 10,000 psig. The increased pressure significantly increases the chances that the casing string fails, with catastrophic consequences to the operation of the well.

What is needed is a method for replacing at least a portion of the conventional fluid within the annular volume with a fluid system which decreases in specific volume as temperature of the fluid is increased.

The annular pressure buildup (APB) problem is well known in the petroleum drilling/recovery industry. See: B. Moe and P. Erpelding, "Annular pressure buildup: What it is and what to do about it," Deepwater Technology, p. 21-23, August (2000), and P. Oudeman and M. Kerem, "Transient behavior of annular pressure buildup in HP/HT wells," J. of Petroleum Technology, v.18, no. 3, p. 58-67 (2005). Several potential solutions have been previously reported: A. injection of nitrogen-foamed cement spacers as described in R. F. Vargo, Jr., et. al., "Practical and Successful Prevention of Annular Pressure Buildup on the Marlin Project," Proceedings—SPE Annual Technical Conference and Exhibition, p. 1235-1244, (2002), B. vacuum insulated tubing as described in J. H. Azzola, et. al., "Application of Vacuum Insulated Tubing to Mitigate Annular Pressure Buildup," Proceedings—SPE Annual Technical Conference and Exhibition, p. 1899-1905 (2004), C. crushable foam spacer as described in C. P. Leach and A. J. Adams, "A New Method for the Relief of Annular Heat-up Pressure," in proceedings, —SPE Annual Technical Conference and Exhibition, p. 819-826, (1993), D. cement shortfall, full-height cementation, preferred leak path or bleed port, enhanced casing (stronger), and use of compressible fluids as described in R. Williamson et. al., "Control of Contained-Annulus Fluid Pressure Buildup," in proceedings, SPE/IADC Drilling Conference paper # 79875 (2003), and E. use of a burst disk assembly, as described by J. Staudt in U.S. Pat. No. 6,457,528 (2002) and U.S. Pat. No. 6,675,898 (2004). These prior art examples, although potentially useful, do not provide full protection against the APB problem due to either difficulties in implementation or prohibitive costs, or both. Our invention is relatively easy to implement and cost effective.

SUMMARY OF THE INVENTION

Accordingly, a process is provided for controlling the pressure within a confined volume, the process comprising:
a) providing a volume containing a first fluid having a first pressure and a first temperature within the volume;
b) replacing at least a portion of the first fluid within the volume with a second fluid;
c) sealing the volume to produce a confined volume;
d) heating the fluid within the confined volume, such that the fluid is at a second pressure and at a second temperature,
wherein the second fluid is preselected such that the second pressure is lower than had the confined volume contained the first fluid only at the second temperature.

In a separate embodiment, a process is provided for controlling the pressure within the casing structure of a wellbore, wherein the pressure may vary from location to location within the wellbore. In this embodiment, the pressure and temperature relate to a single location within the annular volume. Thus, the process comprises:
a) providing an annular volume described by two casing strings within a wellbore and containing a first fluid having a first pressure and a first temperature at a selected location within the annular volume;
b) replacing at least a portion of the first fluid within the annular volume with a second fluid;
c) sealing the annular volume to produce a confined volume;
d) heating the fluid within the confined volume, such that the fluid at the selected location is at a second pressure and at a second temperature,
wherein the second fluid is preselected such that the second pressure at the selected location is lower than the pressure at the selected location within the confined volume would have been had the confined volume contained the first fluid only at the second temperature.

In one embodiment, the second pressure, which occurs at a selected location within the annular volume at a second temperature, is equal to the first pressure at that location, in spite of an increased temperature of the fluid within the volume. In another embodiment, the second pressure at the selected location is no more than 50% higher, preferably no more than 30% higher and more preferably no more than 15% higher than the first pressure at the selected location.

In a separate embodiment, the process is directed to the maximum pressure within the annular volume. For an annular volume with a substantial vertical length, the hydrostatic pressure generated by the annular fluid causes a pressure gradient through the vertical distance, with the pressure at the deepest location of the annular volume being greater than the pressure at the top of the wellbore, where locations relate to the earth's center. Thus, there is a location within the annular volume where the pressure is a maximum pressure. Therefore, in this embodiment, a process is provided for controlling the maximum pressure within the casing structure of a wellbore, the process comprising:
a) providing an annular volume described by two casings strings within a wellbore and containing a first fluid having a first maximum pressure at a first temperature within the annular volume;
b) replacing at least a portion of the first fluid within the annular volume with a second fluid;
c) sealing the annular volume to produce a confined volume; and
d) heating the fluid within the confined volume to an elevated temperature relative to the first temperature, such that at least a portion of the fluid is at a second maximum pressure;
wherein the second fluid is preselected such that the second maximum pressure is lower than the maximum pressure within the confined volume would have been had the confined volume contained the first fluid only at the elevated temperature.

In one embodiment, the second maximum pressure within the annular volume is equal to the first maximum pressure. In this embodiment, there is no net pressure increase within the sealed annular volume, in spite of an elevated temperature of the fluid within the volume.

In another embodiment, the second maximum pressure is no more than 50% higher, preferably no more than 30% higher and more preferably no more than 15% higher then the first maximum pressure.

In a further separate embodiment, a process is provided for controlling the pressure within a confined volume, the process comprising:
a) providing a volume containing a first fluid and a second fluid at a first pressure and at a first temperature;
b) sealing the volume to produce a confined volume;
c) heating the first fluid and the second fluid within the confined volume, such that the first fluid and the second fluid are at a second pressure and at a second temperature,
wherein the second fluid is preselected such that the second pressure is lower than had the confined volume contained the first fluid only at the second temperature.

In a particular embodiment, the second fluid comprises a monomer which polymerizes, with reduced volume, at a temperature and a pressure which is in accordance with the conditions within the sealed annular volume. Accordingly, a process is provided for controlling the pressure within a confined volume comprising:

a) providing a volume containing a first fluid, a portion of which is at a first pressure and at a first temperature;
b) replacing at least a portion of the first fluid within the volume with a second fluid;
c) sealing the volume to produce a confined volume;
d) heating the fluid within the confined volume, such that at least a portion the fluid within the confined volume is at a second pressure and at a second temperature,
wherein the second fluid comprises a monomer which polymerizes at the second pressure and at a temperature in the range of between the first temperature and the second temperature.

Among other factors, the present invention is based on the discovery of fluid systems which have unusual thermal expansion properties, in that the fluids expand, at constant pressure, to a lesser extent than would be expected for an incompressible fluid. Thus, when heated while being confined in a sealed volume, the fluids of the present invention cause a lower pressure increase within the sealed volume than would be expected for a conventional fluid.

DETAILED DESCRIPTION OF THE INVENTION

Figure 1:
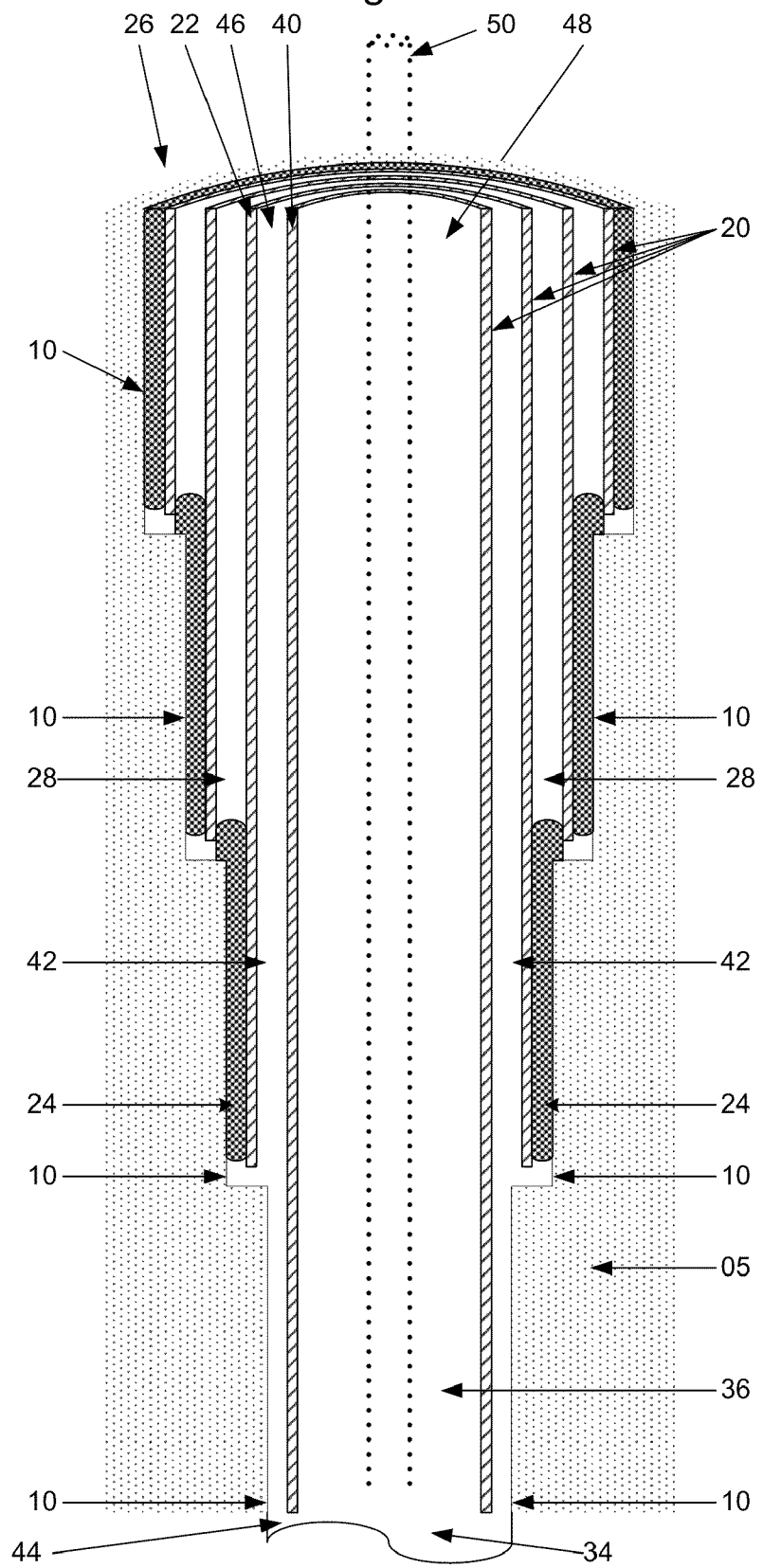
FIG. 1 illustrates an embodiment of the process of the invention, showing an open annular volume, during which time a second fluid is being added to the annular volume.

The present invention provides a fluid system which, when heated within a confined volume, increases in pressure to a lower value than that of a conventional system. The confined volume is sealed to prevent escape of the fluid. Accordingly, the present invention provides a fluid and a method for reducing the effect of a pressure increase within a sealed or confined volume when the fluid within the volume is heated to an elevated temperature.

In one embodiment, the volume may be any fluid-containing volume which is sealed and then heated. A non-limiting example of a volume of this invention is a reaction vessel, for performing, for example, chemical reactions. The volume, initially filled with the first fluid, is open, meaning that a fluid can be made to pass into and out of the volume. Prior to the volume being sealed, a second fluid is made to pass into the volume, replacing at least a portion of the first fluid in the volume. This volume is then sealed to prevent further flow of fluid into and out of the volume, and the fluid within the volume is heated. Such heating causes the pressure to increase to a substantial extent within the volume, particularly with liquid phase fluids, and more particularly with liquid phase fluids which are substantially incompressible. The invention therefore provides a second fluid having the property such that, when contained within the sealed volume and heated to a target temperature, the pressure within the volume is less than the pressure would be if the volume contained the first fluid only.

In a particular embodiment, the invention provides a process for controlling pressures within a wellbore, and particularly within an annular volume within a casing assembly which has been installed in a wellbore, intended, for example, for removing a resource from a reservoir. Examples of resources include crude oil, natural gas liquids, petroleum vapors (e.g. natural gas), synthesis gas (e.g. carbon monoxide), other gases (e.g. carbon dioxide, nitrogen), and water or aqueous solutions.

A casing assembly comprises casing strings for protecting the sides of the wellbore which is formed by drilling into the earth. The annular volume is bounded by two adjacent concentric casing strings within the casing assembly. During construction of oil and gas wells, a rotary drill is typically used to bore through subterranean formations of the earth to form the wellbore. As the rotary drill bores through the earth, a drilling fluid, known in the industry as a "mud," is circulated through the wellbore. The mud is usually pumped from the surface through the interior of the drill pipe. By continuously pumping the drilling fluid through the drill pipe, the drilling fluid can be circulated out the bottom of the drill pipe and back up to the well surface through the annular space between the wall of the wellbore and the drill pipe. The mud is usually returned to the surface when certain geological information is desired and when the mud is to be recirculated. The mud is used to help lubricate and cool the drill bit and facilitates the removal of cuttings as the wellbore is drilled. Also, the hydrostatic pressure created by the column of mud in the hole prevents blowouts which would otherwise occur due to the high pressures encountered within the wellbore. To prevent a blowout caused by the high pressure, heavy weight is put into the mud so the mud has a hydrostatic pressure greater than any pressure anticipated in the drilling.

Different types of mud must be used at different depths because pressure increases in the wellbore with increasing depth of the wellbore. For example, the pressure at 2,500 ft. is much higher than the pressure at 1,000 ft. The mud used at 1,000 ft. would not be heavy enough to use at a depth of 2,500 ft. and a blowout may occur. The weight of the mud at the extreme depths in subsea wells must be particularly heavy to counteract the high pressure. However, the hydrostatic pressure of this particularly heavy mud may cause the mud to start encroaching or leaking into the formation, creating a loss of circulation of the mud. Casing strings are used to line the wellbore to prevent leakage of the drilling mud.

To enable the use of different types of mud, different strings of casing are employed to eliminate the wide pressure gradient found in the wellbore. To start, the wellbore is drilled using a light mud to a depth where a heavier mud is required. This generally occurs at a little over 1,000 ft. At this stage, a casing string is inserted into the wellbore. A cement slurry is pumped into the casing and a plug of fluid, such as drilling mud or water, is pumped behind the cement slurry in order to force the cement up into the annulus between the exterior of the casing and the interior of the wellbore. The amount of water used in forming the cement slurry will vary over a wide range depending upon the type of hydraulic cement selected, the required consistency of the slurry, the strength requirement for a particular job, and the general job conditions at hand.

Typically, hydraulic cements, particularly Portland cements, are used to cement the well casing within the wellbore. Hydraulic cements are cements which set and develop compressive strength due to the occurrence of a hydration reaction which allows them to set or cure under water. The cement slurry is allowed to set and harden to hold the casing in place. The cement also provides zonal isolation of the subsurface formations and helps to prevent sloughing or erosion of the wellbore.

After the first casing is set, the drilling continues until the wellbore is again drilled to a depth where a heavier mud is required and the required heavier mud would start encroaching and leaking into the formation, generally at around 2,500 feet. Again, a casing string is inserted into the wellbore inside the previously installed string, and a cement slurry is added as before.

Multiple casing strings may also be used in the wellbore to isolate two or more formations which should not communicate with one another. For example, a unique feature found in the Gulf of Mexico is a high pressure fresh water sand that flows at a depth of about 2,000 feet. Due to the high pressure, an extra casing string is generally required at that level. Otherwise, the sand would leak into the mud or production fluid.

A subsea wellhead typically has an outer housing secured to the sea floor and an inner wellhead housing received within the outer wellhead housing. During the completion of an offshore well, the casing and tubing hangers are lowered into supported positions within the wellhead housing through a BOP stack installed above the housing. Following completion of the well, the BOP stack is replaced by a Christmas tree having suitable valves for controlling the production of well fluids. The casing hanger is sealed off with respect to the housing bore and the tubing hanger is sealed off with respect to the casing hanger or the housing bore, so as to effectively form a fluid barrier in the annulus between the casing and tubing strings and the bore of the housing above the tubing hanger. After the casing hanger is positioned and sealed off, a casing annulus seal is installed for pressure control. If the seal is on a surface well head, often the seal can have a port that communicates with the casing annulus. However, in a subsea wellhead housing, there is a large diameter low pressure housing and a smaller diameter high pressure housing. Because of the high pressure, the high pressure housing must be free of any ports for safety. Once the high pressure housing is sealed off, there is no way to have a hole below the casing hanger for blowout prevention purposes.

Representatively illustrated in FIG. 1 is a method which embodies principles of the present invention. In the following description of the method and other apparatus and methods described herein, directional terms, such as "above", "below", "upper", "lower", etc., are used only for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention. The process described herein is applicable to wellbores in landed sites and in underwater sites. It should be understood that the wellbore terminates at one end where the wellbore enters the earth. In the case of underwater sites, the terminus is at the water/earth interface.

It should be understood that use of the terms "wellbore" and "casing string" herein are not to be taken as limiting the invention to the particular illustrated elements of the methods. The wellbore could be any wellbore, such as a branch of another wellbore, and does not necessarily extent directly to the earth's surface. The casing string could be any type of tubular string, such as a liner string, etc. The terms "casing string" and "linear string" are used herein to indicate tubular strings of any type, such as segmented or un-segmented tubular strings, tubular strings made of any materials, including nonmetal materials, etc. Thus, the reader will appreciate that these and other descriptive terms used herein are merely for convenience in clearly explaining the illustrated embodiments of the invention, and are not used for limiting the scope of the invention.

FIG. 1 illustrates an embodiment of the invention. A wellbore 10 has already been drilled using drill string 50, and a casing assembly 20, comprising at least two casing strings in a concentric arrangement with respect to each other, has been previously installed. The drill rig, with supporting means for supporting the drill string, for installing the casing strings, and for supplying the fluids to the wellbore, is not shown. In FIG. 1, casing string 22 has been installed, and is sealed at or near one end against the wellbore 10 by a cement plug 24.

Particular attention is now directed to casing string 40, which has been installed to extend to wellbore terminus 34. It is clear that terminus 34 may be a temporary terminus, such that the wellbore may be extended further after casing string 40 has been installed. Alternatively, casing string 40 may extend to the ultimate depth in formation 5, and the wellbore will not be extended before production commences. An annular volume 42, described by the inside surface of casing string 22 and the outside surface of casing string 40, is filled with a fluid, and generally filled with the fluid which is present within the wellbore volume 36 when casing string 40 is installed. Conventional fluids which may initially be present in the annular volume include a drilling fluid or a completion fluid, depending on the circumstances of the drilling operation. The properties of the fluid initially within the annular volume, herein termed the first fluid, is selected to meet the needs of the wellbore drilling practitioner for drilling to complete the well. In an embodiment, the first fluid is an incompressible fluid, using the conventional definition.

At the stage in the process illustrated in FIG. 1, the annular volume 42 is in fluid communication with the wellbore volume 36 via the opening 44 at one end of the casing. The other end of the annular volume, designated by 46, is in fluid communication with surface equipment, such as a drilling rig, (not shown), which has the means for recovering a fluid leaving the annular volume through 46. Environmental concerns provide the incentive for minimizing the amount of fluid lost to the environment through 46.

In the process of the invention, a second fluid is introduced into the wellbore volume 36 through opening 48 to replace at least a portion of the first fluid in the annular volume 42. Opening 48 is in fluid communication with means for supplying the second fluid. Pumping means for this purpose may be located, for example, on a drilling rig or a production rig. The second fluid is supplied to the volume as a plug or pill, and passes downward through the wellbore volume 36 in relatively pure form. At the wellbore terminus 34, the second fluid enters the annular volume 42 through opening 44, and passes upward, driving the first fluid originally in the annular volume 42 ahead of the second fluid pill, and out of the annular volume through opening 46. The amount of the second fluid which is supplied to the annular volume is a matter of engineering choice, depending on the amount of pressure which can be tolerated inside the sealed annular volume 42. This amount is further influence by, for example, the size of the well system, the temperature of the second fluid when it is supplied to the annular volume, the temperature of the fluids which will be produced in the well, expected temperature of the fluid in the annular volume during production, design and specifications of the casing string and the like.

Figure 2:
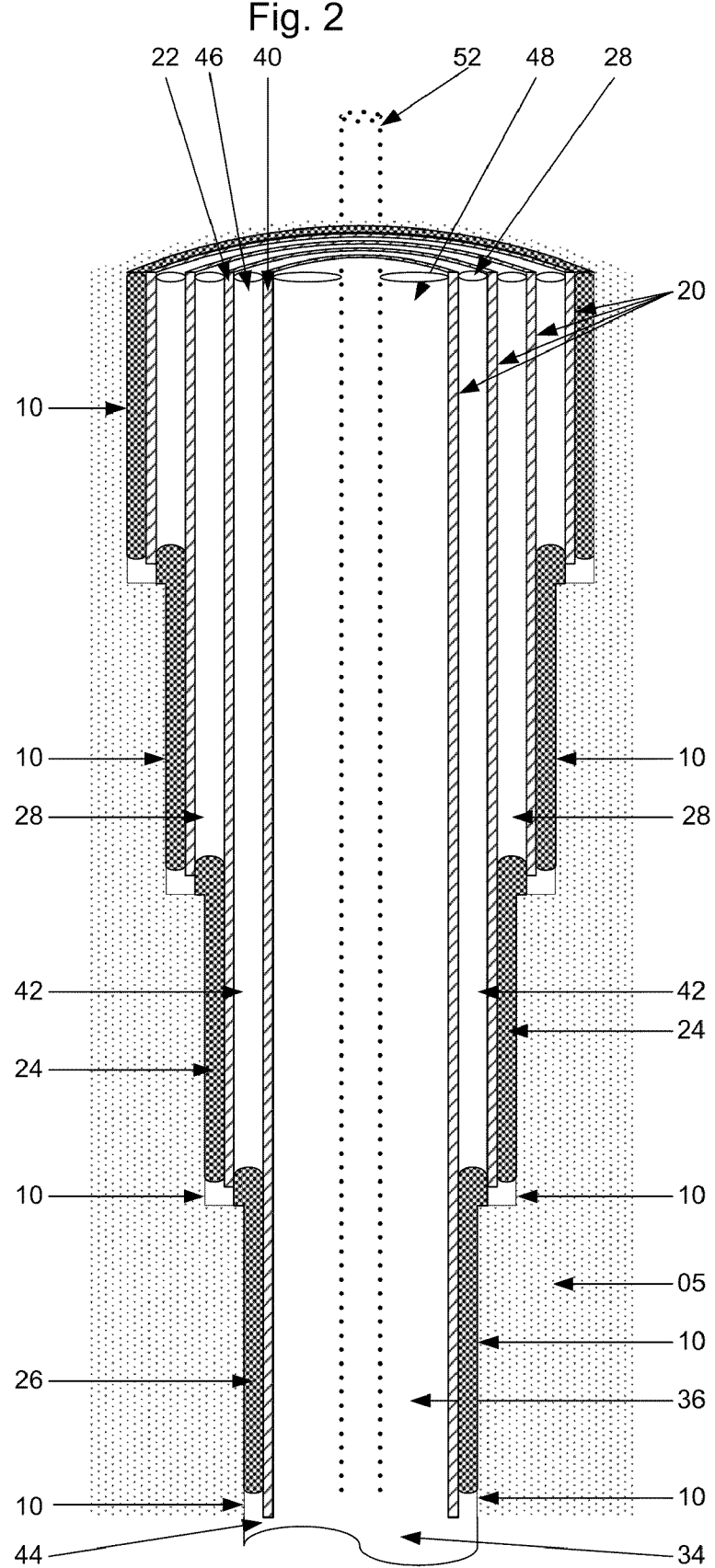
FIG. 2 illustrates an embodiment of the process of the invention, showing a sealed annular volume containing a second fluid at a second temperature and at a second pressure, as disclosed herein.

After a sufficient amount of the second fluid has been added to annular volume 42 to replace at least a portion of the first fluid contained therein, the annular volume 42 is sealed. FIG. 2 illustrates the annular volume 42 sealed by a concrete plug at 26, and by the casing annulus plug, shown at 28. Generally, the casing annulus seal seals the top of the wellbore, preventing escape of fluids from the wellbore into the environment. Thus, the sealed, or confined, volume represented by the annular volume 42 of the casing strings contains a fluid, which is confined in place and prevented from leaking from the volume to any noticeable extent.

In the embodiment illustrated in FIG. 2, at least a portion of a first fluid contained within a volume such as an annular volume 42, and having a first pressure and a first temperature within the volume, is replaced with a second fluid, such that the volume is filled with the combination of the first fluid and the second fluid. The annular volume 42, between the casing strings 22 and 40, is sealed by concrete plug 26 and by casing annulus plug 28. The temperature of the fluid within the annular volume 42, comprising the second fluid, is generally within the range of 0°-100° F. For subsea installations, the fluid temperature (ie. the first temperature) is often less than 60° F., or less than 40° F., or, for example, in the temperature range between 25° F. and 35° F.

When hydrocarbon fluids begin to be produced and to flow up through production conduit 52 and out of the wellbore 10, these fluids are generally at a higher temperature than the first temperature. Production fluid temperatures in the range of 50° F. to 300° F. are expected, and temperatures in the range of 125° F. to 250° F. are frequently encountered. The relatively hotter production fluids within conduit 52 heat the fluid within the confined annular volume 42, such that the fluid is at a second pressure and at a second temperature. In conventional systems, the fluid pressure within the sealed annular volume would begin to increase to a significantly higher pressure as the temperature increases. In contrast, according to the present invention, the second fluid is preselected such that the second pressure within the confined volume, after the temperature of the fluid within the volume is increased to the second temperature, is lower than had the confined volume contained the first fluid only at the second temperature.

The benefits and advantages derived from practice of the invention are contrasted with the deficiencies of the conventional process. The annular volume is initially filled with a first fluid. The temperature of the first fluid may be at ambient temperature or below, depending on the condition of the wellbore during addition of the first fluid. For subsea wellbores, the first fluid may be cooled by the water through which the first fluid passes enroute from the source at the drilling platform to the wellbore. Under these conditions, the first fluid will generally be at a temperature in the range of 0° F. to 100° F. For subsea installations, the fluid temperature (ie. the first temperature) is often less than 60° F., or less than 40° F., or, for example, in the temperature range between 25° F. and 35° F. After the fluid is sealed within the annular volume, it is heated by the production fluids passing upward through the production tubing 52 in the wellbore; the increased temperature conventionally results in an increase in pressure, sometimes up to catastrophic levels.

Annular Pressure

In contrast, this pressure within the annular volume is controlled to manageable levels by the present process. In the practice of the invention, a confined volume which contains a fluid is heated, such that the fluid within the confined volume is at a second pressure and at a second temperature. In one embodiment, the second pressure is uniform throughout the confined volume. In another embodiment, the second pressure may vary from place to place within the volume. In this embodiment, therefore, the second pressure (and second temperature) is referenced to a particular location, termed the selected location, within the annular volume. For example, the annular volume within the casing assembly in a wellbore can have a vertical extent of hundreds, and even thousands, of feet. The hydrostatic pressure within the fluid-filled wellbore is thus expected to be higher at the bottom of the wellbore than at its top. In another embodiment, therefore, the present process is directed to controlling the maximum pressure within the annular volume, taking account of the hydrostatic head and other factors within the volume.

For purposes of this disclosure, the target pressure is the desired pressure within the annular volume during the practice of the present invention. In one embodiment, the target pressure in the practice of the invention is a second pressure which is lower than had the confined volume contained the first fluid only. In another embodiment, the second pressure is equal to the first pressure within the annular volume. In another embodiment, the second fluid is preselected such that the second pressure of the second fluid contained within the sealed annular volume at the second temperature is no more than 50% higher, preferably no more than 30% higher, and more preferably no more than 15% higher than the first pressure of the unsealed annular volume at a first temperature and containing the first fluid only.

In many cases, the first pressure, the first temperature, the second pressure and the second temperature may be measured and the quantitative value of each may be known. It will be recognized by the skilled practitioner, however, that the invention may be practiced in its entirety without knowledge of the quantitative values of these parameters. It is sufficient for the practice of the invention that the second pressure be maintained below the pressure limit at which the integrity of the container (e.g. the casing string) in which the fluid is contained will be compromised to an unacceptable extent.

Second Fluid System

As used herein, the fluid which is added to the annular volume to control the pressure within the annular volume is termed the second fluid or, in the alternative, the annular fluid. As such, the second fluid has thermal expansion properties which cause a lower pressure increase within the annular volume than would be expected for a substantially incompressible liquid. The fluid which is present in the wellbore volume 36 during installation of the casing string 40, and therefore the fluid which is initially within the annular volume 42 when the casing string is installed, is termed the first fluid. The composition of the first fluid is not critical for the invention, and will generally be one of various fluids used in drilling and completing the well, including, for example, a drilling fluid or a completion fluid. Drilling fluids may be water or oil based, and may further comprise surfactants, salts, weighting agents and any other materials which are needed for effective cooling of the drill bit, removal of cuttings, and protection and conditioning of the wellbore for fluid production. Likewise, completion fluids may be water or oil based, and may further comprise materials for cleaning the wellbore and installed structures in preparation for recovery of fluids from the formation.

In the practice of the invention, the first fluid within the annular volume is replaced, at least in part, by a second fluid. In general, the second fluid comprises a liquid component and an additional component which contributes to the desired properties as described herein. In one embodiment, the second fluid is an incompressible fluid. In a separate embodiment, the combination of the first fluid and the second fluid is an incompressible fluid, using the conventional meaning. The liquid component may comprise water, hydrocarbons or both, including, for example, one or more components of a drilling fluid. Aqueous solutions containing dissolved organic and/or inorganic salts, acids or bases may be included in the second fluid system. Hydrocarbon mixtures, including materials typically found in drilling fluids or completion fluids may be included. Examples include diesel fuel, $C_6$ to $C_{20}$ mixtures, alcohols, aldehydes, ketones, ethers, carbonyls, aromatics, paraffins and cycloparaffins. Emulsions with a continuous aqueous phase and a discontinuous organic phase may be included; alternatively, emulsions with a continuous organic phase and a discontinuous aqueous phase may be included. Further, the second fluid may include a liquid phase as the continuous phase, and further include solids, which may be present as a slurry or as massive particles. Or, the second fluid may comprise a liquid as a continuous phase, either layered with a vapor phase, or containing a vapor phase in the form of bubbles within the liquid. In another embodiment, the second fluid comprises liquid, vapor and solid phases, in any or all of the forms described above. In each alternative, the second fluid has unexpected expansion properties with respect to an increase in temperature of the fluid.

Anhydrous Inorganic Materials

In one embodiment, the second fluid comprises anhydrous inorganic materials, in an aqueous-containing carrier fluid. The addition of anhydrous inorganic crystals or materials into the annular volume absorbs the excess water into their structure, and alleviates the annular pressure problem. For example, each formula quantity of anhydrous calcium sulfate (including industrial versions, such as gypsum and plaster-of-paris) absorbs 10 waters of hydration into its crystalline structure. Also effective are inorganic compounds such as barium oxide or calcium oxide, which also absorb water. Aluminosilicate materials, including crystalline aluminosilicates such as zeolites, dehydrate liquids by trapping water at the molecular level. Example zeolites for this application are 3A, 4A, 13X and Y zeolite. These zeolites do not expand upon hydration, and, in fact, release air during the process. Any air released during hydration will be introduced into the confined annular volume. Since air is compressible, the air pocket developed by the hydrating zeolites provides a pressure buffer as the fluid in the annular volume is heated.

In a preferred embodiment of the invention, pellets of a water absorbing inorganic compound may be encapsulated with any material that can slowly dissolve in the trapped fluid, such as a slowly soluble polymer, so that the reaction can be delayed enough to provide circulation time before the absorbent action occurs. This could also work in binary or ternary systems where water is a small component of the mixture that is trapped (e.g., 6% water, balance as mineral oil or other such admixture). Non-limiting examples of a slowly soluble polymer include poly(vinylalcohol), carboxymethyl cellulose and gelatin.

In a separate embodiment, at least a portion of the inorganic materials supplied to the annular volume in the second fluid comprises a zirconium tungstate or a zirconium molybdate having a negative coefficient of thermal expansion.

Cross-Linked Polymeric Materials

In a separate embodiment, one or more cross-linked organic/polymeric materials are included in the annular fluid of this invention to counteract the increase in pressure as the annular fluid is heated within the sealed volume. Any dimensionally stable open porous foam material (e.g. polystyrene foam and polyurethane foam) can be suitably used for this purpose. The effectiveness of the polymeric material for counteracting the effect of increasing pressure is enhanced when coated with a slowly soluble polymer. In this way, the polymeric material coated with the slowly soluble polymer is introduced to the annular volume. Following cementing, the slowly soluble polymer dissolves, exposing the cross-linked polymer to the annular fluid. Increasing the pressure causes the cross-linked polymer to crush, which both reduces the pressure within the annular volume, and dislodges the vapor which was originally trapped within the cross-linked polymer. Both the crushing of the polymer and the generation of a compressible gas contributes to the decrease in pressure within the annular volume.

Polymerization System

In a separate embodiment, a process is provided for controlling the pressure within a confined volume by providing a second fluid comprising a monomer which polymerizes with a reduction in specific volume at the second pressure and at a temperature in the range of between the first temperature to the second temperature. According to this embodiment, the pressure within the sealed annular volume is decreased on heating by the polymerization of a monomer which is added to the annular fluid prior to sealing the volume. Both a water soluble monomer and a water insoluble monomer, when added to the annular volume, can polymerize, with an accompanying decrease in volume (and associated decrease in pressure within the annular volume). Such a decrease in volume would, in the confined volume of the sealed annulus, result in a decrease in pressure, within the confined volume, relative to a similar system without polymerization of the particular monomers of the present invention.

The monomer of the invention may be mixed with water, with oil, or with a more complex mixture characteristic of a drilling mud, including high density components in the preparation of the second fluid. The monomer will be present in the second fluid in the range of 1 to 99 vol %, more preferably in the range of 5 to 75 vol %, still more preferably in the range of 10 to 50 vol %. An example second fluid comprises 20 vol % of the monomer and 80 vol % of a second component comprising water and a high density material such as barium sulfate.

With polymerization of monomers, including polymerization of acrylates, such as methyl acrylate and methyl methacrylate, as much as a 25% reduction in volume between the liquid monomer and solid polymer can result from the polymerization process. See, for example, "Acrylic and Methacrylic Ester Polymers", in *Encyclopedia of Polymer Science and Engineering*, 2nd Edition, J. Kroschwitz, ed., John Wiley & Sons, Inc., Volume 1, Table 20, p. 266, (1985), and D. A. Tildbrook, at. al, "Prediction of Polymerization Shrinkage Using Molecular Modeling," J. Poly. Sci; Part B: Polymer Physics, 41, 528-548 (2003). In a preferred embodiment of this invention, the monomer is suspended or emulsified (using soap) in water as a water/oil mixture with appropriate polymerization initiator(s), pumped into the annular space, and after cementation, polymerization occurs (again, taking advantage of slow kinetics at the nearly freezing temperature), with a total volume decrease of up to 5% can be achieved with a 20% vol/vol mixture of monomer and water. Non-limiting examples of other vinyl monomers that could be practical for this in-situ polymerization process include other acrylic esters, methacrylic esters, butadiene, styrene, vinyl chloride, N-vinylpyrrolidone, N-vinylcaprolactam, or other such oil and/or water soluble monomers.

Additional benefits can be derived from the choice of initiator for the polymerization process. An azo-type initiator produces nitrogen gas as a by-product during the polymerization process. The resulting gas phase component which is generated in the confined annular volume, being a compressible fluid, can contribute to the control of the pressure within the confined annular volume as the annular fluid is being heated by the product fluid passing through the production tubing. A peroxide initiator may also be used, depending on the temperature and chemical constraints of the product fluid. Alternatively, a redox initiator system such as ammonium persulfate and the activator N,N,N'N'-tetramethylethylenediamine, or potassium persulfate and the activator ferrous sulfate/sodium bisulfate could also be used if encapsulated as mentioned above to control the timing of when the polymerization occurs.

Gas Generating Material

In another embodiment, the addition of a gas generating material provides a compressible gas pocket that alleviates the annular pressure problem. An example of a gas generating material useful for the invention comprises combining citric acid and bicarbonate, in a 1:2 weight ratio, with a small amount of witch hazel extract, into a moldable product which evolves carbon dioxide gas when hydrated with water. Preferably, pellets of this material are coated and/or encapsulated with a slowly water soluble polymer, as described above. In using these pellets in the practice of the invention, the coated pellets are pumped into the annular volume, which is then sealed as described. The "timed release" of the pellets generates evolved gas, which is trapped at the upper levels in the annular volume.

Binary Fluid System

In another embodiment, the second fluid system is a binary fluid system comprising two liquids which have a negative blending volume coefficient. By a negative blending volume coefficient is meant having the property which, when the two liquids are blended together, the volume of blended liquid is less than the sum of the volumes of the two liquids prior to blending. Example fluids with this particular property include a blend of alcohol with an aqueous fluid. Example alcohols include $C_1$ to $C_8$ alcohols; preferred alcohols are methanol, ethanol, propanol and butanol. In this case, the aqueous fluid may be the drilling fluid which is present in the annular volume following installation of the casing string.

It is important to maintain the alcohol as a separate phase until the annular volume is sealed, as described, before forming the blend with the second liquid. In one embodiment, the alcohol is pumped into the annular volume as a relatively pure plug; with the major mixing of the alcohol phase with the aqueous phase occurring within the annular volume after the annular volume is sealed. Alternatively, the alcohol is encapsulated with any material that can slowly dissolve in the trapped fluid, such as a slowly soluble polymer, so that the mixing of the two phases can be delayed enough to ensure that mixing occurs after the volume is sealed. Non-limiting examples of a slowly soluble polymer include poly(vinylalcohol), carboxymethyl cellulose and gelatin.

Thus, prior to or during heating of the annular volume during production of the hot fluids, the slowly soluble polymer is dissolved and the alcohol phase mixes with the aqueous phase, resulting in a reduction in pressure within the annular volume relative to the pressure which would have been present had the alcohol phase not been added as described. In carrying out this embodiment, an alcohol phase is added up to 90%, preferably in the range of 5 vol % to 80 vol %, more preferably in the range of 10 vol % to 50 vol % of the total volume of the liquid in the annular volume, the specific amount depending on the specific application.

EXAMPLE

Laboratory experiments demonstrated an effective reduction in volume of a mixture of methyl methacrylate in an emulsion polymerization process, and by example below, the process was proven to work in an apparatus which holds volume constant, while monitoring pressure during a heating cycle (Example 1), and in a field experiment using a 500 foot test well (Example 2).

Example 1

Figure 3:
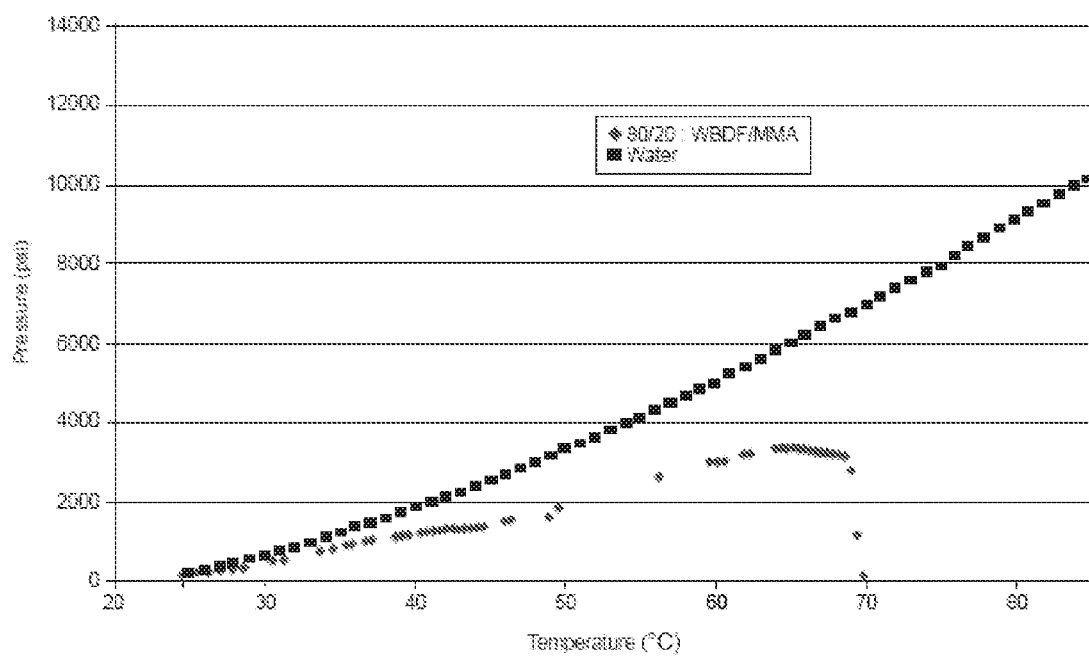
FIG. 3 illustrates an experimental result from testing one embodiment of the invention.

A pressure bomb was filled with an aqueous fluid at 200 psig starting pressure. The bomb was then sealed to prevent escape of fluids from the bomb, and heated from 24° C. to 100° C. As shown in FIG. 3, the pressure of the fluid within the bomb increased to 14,000 psig during the heating cycle.

The pressure bomb used above was filled with an aqueous emulsion fluid containing a 20% volume loading of methyl methacrylate (with azo-type intitiator) at 200 psig starting pressure. The bomb was then sealed to prevent escape of fluids from the bomb, and heated from 24° C. to 100° C. As shown in FIG. 3, the pressure of the fluid within the bomb increased to approximately 3000 psig, but at a lower rate of increase than with the aqueous fluid alone. At approximately 70° C., polymerization of the methyl methacrylate monomer was initiated, and the pressure within the bomb decreased to below the initial pressure within the bomb.

Example 2

Figure 4:
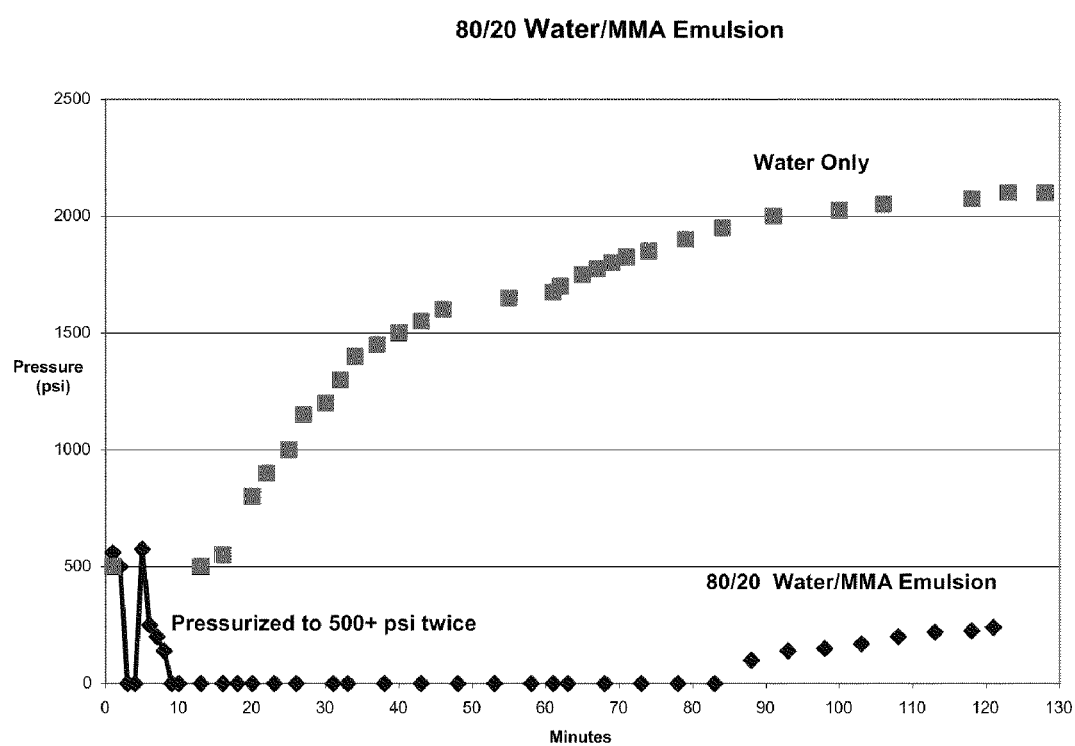
FIG. 4 illustrates an experimental result from testing one embodiment of the invention.

A scaled up field experiment was also performed. Water was used in a 500 foot deep test well within an annular space confined by 7 inch and 9⅝ inch casings. After placement of the fluid, the annular space was pre-pressurized to 500 psig, and then heated by circulating hot water inside the 7 inch pipe. Over a period of 2 hours, the temperature input was 190 F, and a temperature out of 160 F (due to the down-hole formation absorbing heat). The resulting pressure was about 2100 psig (FIG. 4).

A similar emulsion fluid as described in Example 1, containing 20% volume loading of methyl methacrylate (with azo-type initiator) was used in the same test well. Within several minutes after the initial 500 pre-pressurization, it was noted that the pressure had already dropped to zero, so the annulus was again pressurized up to 500 psig. Over a period of 2 hours, the temperature was elevated as before, and it was noted that the input and output temperatures were virtually identical due to the heat generated by the polymerization reaction. The pressure again decreased to zero, and then slowly increased to a final stable pressure of 240 psig (FIG. 4). The significant drop in pressure was due to the shrinkage of the monomer to polymer. Samples collected at the end of the experiment were analyzed for monomer and polymer. There was evidence of a trace amount of monomer (<1%), and the polymer had a weight-average molecular weight of nearly 3 million.

What is claimed is:

1. A process for controlling the pressure within a confined volume comprising:
    a) providing a volume containing a first fluid having a first pressure and a first temperature within the volume;
    b) replacing at least a portion of the first fluid within the volume with a second fluid comprising a gas generating material, wherein the gas generating material is a combination of citric acid and bicarbonate encapsulated in a slowly soluble polymer;
    c) sealing the volume to produce a confined volume;
    d) heating the fluid within the confined volume, such that the fluid is at a second pressure and at a second temperature;

wherein the second fluid is preselected such that the second pressure is lower than had the confined volume contained the first fluid only at the second temperature.

2. The process according to claim 1 wherein the volume is an annular volume.

3. The process according to claim 1 wherein the annular volume is described by two concentric casing strings within a wellbore.

4. The process according to claim 1, wherein the first temperature is in the range of from 0° F. to 100° F.

5. The process according to claim 1, wherein the second temperature is in the range of 50° F. to 300° F.

6. The process according to claim 5, wherein the second temperature is in the range of 125° F. to 250° F.

7. The process according to claim 1, wherein the fluid within the confined volume of step (c) is at the first pressure and at the first temperature.

8. The process according to claim 1, wherein the first pressure is the maximum pressure of the first fluid within the volume of step (a), and wherein the second pressure is the maximum pressure of the fluid within the volume of step (d).

9. The process according to claim 1, wherein the first pressure of the fluid at the first temperature within the volume of step (a) is at a selected location within the volume, and wherein second pressure of the fluid at the second temperature within the volume of step (d) is at the selected location within the volume.

10. The process according to claim 1, wherein the slowly soluble polymer is selected from the group consisting of poly(vinylalcohol), carboxymethyl cellulose and gelatin.

11. A process for controlling the pressure within the casing structure of a wellbore, comprising:
   a) providing an annular volume described by two casing strings within a wellbore and containing a first fluid having a first pressure and a first temperature at a selected location within the annular volume;
   b) replacing at least a portion of the first fluid within the annular volume with a second fluid comprising a gas generating material, wherein the gas generating material is a combination of citric acid and bicarbonate encapsulated in a slowly soluble polymer;
   c) sealing the annular volume to produce a confined volume;
   d) heating the fluid within the confined volume, such that the fluid at the selected location is at a second pressure and at a second temperature;
   wherein the second fluid is preselected such that the second pressure at the selected location is lower than the pressure at the selected location within the confined volume would have been had the confined volume contained the first fluid only at the second temperature.

12. The process according to claim 11, wherein the second pressure is no more than 50% higher than the first pressure.

13. The process according to claim 11, wherein the second pressure is no more than 30% higher than the first pressure.

14. The process according to claim 11, wherein the second pressure is no more than 15% higher than the first pressure.

15. The process according to claim 11, wherein the second pressure is equal to the first pressure.

16. A process for controlling the pressure within the casing structure of a wellbore, comprising:
   a) providing an annular volume described by two casing strings within a wellbore and containing a first fluid having a first maximum pressure at a first temperature within the annular volume;
   b) replacing at least a portion of the first fluid within the annular volume with a second fluid comprising a gas generating material, wherein the gas generating material is a combination of citric acid and bicarbonate encapsulated in a slowly soluble polymer;
   c) sealing the annular volume to produce a confined volume;
   d) heating the fluid within the confined volume to an elevated temperature relative to the first temperature, such that at least a portion of the fluid is at a second maximum pressure;
   wherein the second fluid is preselected such that the second maximum pressure is lower than the maximum pressure within the confined volume would have been had the confined volume contained the first fluid only at the elevated temperature.

17. A process for controlling the pressure within a confined volume comprising:
   a) providing at a first pressure and at a first temperature a volume containing a first fluid and a second fluid comprising a gas generating material, wherein the gas generating material is a combination of citric acid and bicarbonate encapsulated in a slowly soluble polymer;
   b) sealing the volume to produce a confined volume;
   c) heating the first fluid and the second fluid within the confined volume, such that the first fluid and the second fluid are at a second pressure and at a second temperature;
   wherein the second fluid is preselected such that the second pressure is lower than had the confined volume contained the first fluid only at the second temperature.

* * * * *

UNITED STATES PATENT AND TRADEMARK OFFICE
CERTIFICATE OF CORRECTION

| | | |
|---|---|---|
| PATENT NO. | : 7,963,333 B2 | Page 1 of 1 |
| APPLICATION NO. | : 12/641257 | |
| DATED | : June 21, 2011 | |
| INVENTOR(S) | : Hermes et al. | |

It is certified that error appears in the above-identified patent and that said Letters Patent is hereby corrected as shown below:

Front page, Item (75) Inventors: Delete inventor "Don M. Coates, Santa Fe, NM (US)"

Signed and Sealed this
Thirteenth Day of September, 2011

David J. Kappos
*Director of the United States Patent and Trademark Office*